(12) United States Patent
Grasso et al.

(10) Patent No.: US 7,719,223 B2
(45) Date of Patent: May 18, 2010

(54) SWITCHING NODE BASED SENSORLESS MOTOR CONTROL FOR PM MOTOR

(75) Inventors: Massimo Grasso, Trivolzio (IT); Andrea (Francesco) Merello, Arese (IT); Christian Locatelli, Broni (IT)

(73) Assignee: International Rectifier Corporation, El Segundo, CA (US)

( * ) Notice: Subject to any disclaimer, the term of this patent is extended or adjusted under 35 U.S.C. 154(b) by 376 days.

(21) Appl. No.: 11/683,150

(22) Filed: Mar. 7, 2007

(65) Prior Publication Data

US 2007/0212034 A1 Sep. 13, 2007

Related U.S. Application Data

(60) Provisional application No. 60/780,554, filed on Mar. 9, 2006.

(51) Int. Cl.
*G05B 11/28* (2006.01)
(52) U.S. Cl. .................. 318/599; 318/811; 318/459
(58) Field of Classification Search ........... 318/599, 318/811, 432, 459, 500
See application file for complete search history.

(56) References Cited

U.S. PATENT DOCUMENTS

| 5,430,362 | A | | 7/1995 | Carr et al. |
|---|---|---|---|---|
| 5,650,708 | A | | 7/1997 | Sawada et al. |
| 5,670,859 | A | * | 9/1997 | North et al. ............ 318/801 |
| 5,825,597 | A | | 10/1998 | Young |
| 5,900,683 | A | | 5/1999 | Rinehart et al. |
| 6,121,736 | A | * | 9/2000 | Narazaki et al. ........ 318/400.35 |
| 6,323,610 | B1 | * | 11/2001 | Ng et al. ............ 318/400.2 |
| 6,670,785 | B1 | * | 12/2003 | Liang et al. ............ 318/801 |
| 2004/0227476 | A1 | | 11/2004 | Guerra |

* cited by examiner

*Primary Examiner*—Rina I Duda
(74) *Attorney, Agent, or Firm*—Farjami & Farjami LLP

(57) ABSTRACT

A circuit for indirectly measuring a sign of a current flowing in an inverter stage coupled to a phase of a motor or indirectly measuring the sign of the voltage induced by a counter Electromotive Force (EMF) in a coil of the phase of the motor, the inverter stage being connected between a power supply and the ground. The circuit includes a gate driver circuit coupled to the inverter stage for alternatively connecting the phase of the motor to the power supply and to ground, the gate driver circuit having a current sign detection circuit, wherein the current sign detection circuit senses the sign of the current flowing in the inverter stage, or the sign of the counter EMF for controlling the commutation of switches in the inverter stage.

17 Claims, 10 Drawing Sheets

SWITCHING NODE BASED SENSORLESS MOTOR CONTROL FOR PM MOTOR

CROSS-REFERENCE TO RELATED APPLICATIONS

This application is based on and claims priority to U.S. Provisional Patent Application Ser. No. 60/780,554, filed on Mar. 9, 2006 and entitled $V_S$ (SWITCHING NODE) BASED ON SENSORLESS MOTOR CONTROL FOR PM MOTOR, the entire contents of which are hereby incorporated by reference herein. Also, the disclosures of U.S. patent application Ser. Nos. 10/712,893, filed on Nov. 12, 2003 and 11/207,465, filed on Apr. 19, 2005 are incorporated herein by reference.

BACKGROUND OF THE INVENTION

The present invention relates to an integrated system that produces an indirect measurement of the sign of the current that flows into/out-of an inverter driving a motor and is able to sense the counter Electromotive Force (EMF) voltage induced in a coil of the motor by measuring a phase voltage.

Motor drive applications make wide use of inverter bridges for providing voltage to the motor. Inductive characteristics of the motors of these motor drive applications are such that coil currents keep flowing into the inverter stage for a while, before decaying to zero. In particular, this is true for both AC induction and brushless motors. Moreover, for brushless motors under particular conditions, the counter or back EMF induces a voltage on the phase nodes which is proportional to a mechanical speed of the motor.

SUMMARY OF THE INVENTION

It is an object of the present invention to provide a system that is able to compare voltage of a Half-Bridge leg of the inverter to a threshold and provide an output that varies according to the comparison result.

It is another object of the present invention, when used in a motor drive system that runs a motor, to sense the sign of the current, i.e., the direction of the current, flowing into or out-of a motor for sensorless motor control.

By sensing the sign of the current at the so-called switched node VS, the need for an A/D converter for connecting the voltage lead at the switched node for controlling the motor can be eliminated.

It is yet another object of the present invention, when used in a motor drive system that runs a motor, to sense the motor counter EMF when the motor current has decayed to zero.

A circuit is provided for indirectly measuring a sign of a current flowing in an inverter stage coupled to a phase of a motor or indirectly measuring the sign of the voltage induced by a counter Electromotive Force (EMF) in a coil of the phase of the motor, the inverter stage being connected between a power supply and the ground. The circuit includes a gate driver circuit coupled to the inverter stage for alternatively connecting the phase of the motor to the power supply and to ground, the gate driver circuit having a current sign detection circuit, wherein the current sign detection circuit senses the sign of the current flowing in the inverter stage, or the sign of the counter EMF for controlling the commutation of switches in the inverter stage.

Other features and advantages of the present invention will become apparent from the following description of the invention that refers to the accompanying drawings.

DETAILED DESCRIPTION OF EMBODIMENTS OF THE INVENTION

Figure 1:
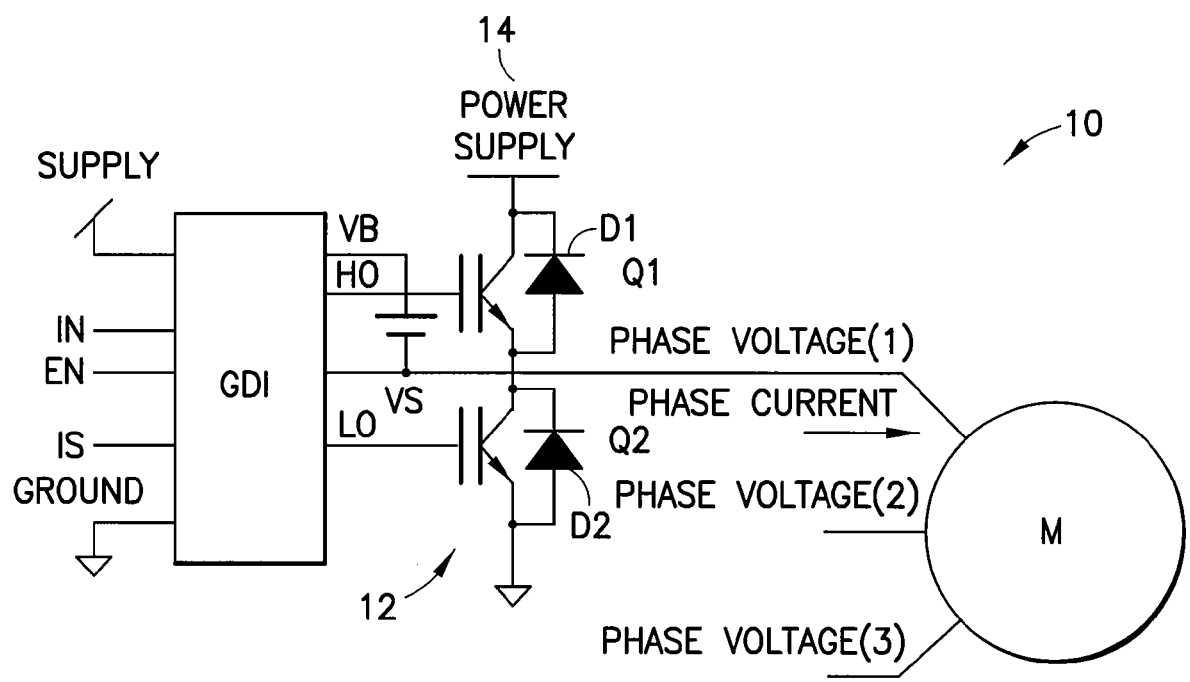
FIG. 1 is a diagram of a system of the present invention having a gate driver for driving a three phase inverter connected to a motor, only one of the three switch legs of the inverter being shown.

FIG. 1 illustrates a system 10 of one embodiment of the present invention. The system 10 includes a three-phase inverter bridge configuration, of which only one switch leg stage 12 is shown. Each inverter stage 12 including two power devices, i.e., a high side switch Q1 and a low side switch Q2, connected to a phase of the motor M. The inverter stage 12 is controlled by a gate drive system composed of a gate driver integrated circuit GD1. Each power device, i.e., Q1, Q2, includes a respective in series coupled freewheeling rectifier D1, D2.

The inverter stage 12 alternatively connects the phase of the motor M to a power supply 14 and the ground following a pulse width modulation scheme that allows current to flow into the motor. When tri-stated, the inverter current decays to zero according to the impedance of the motor.

Figure 2A:
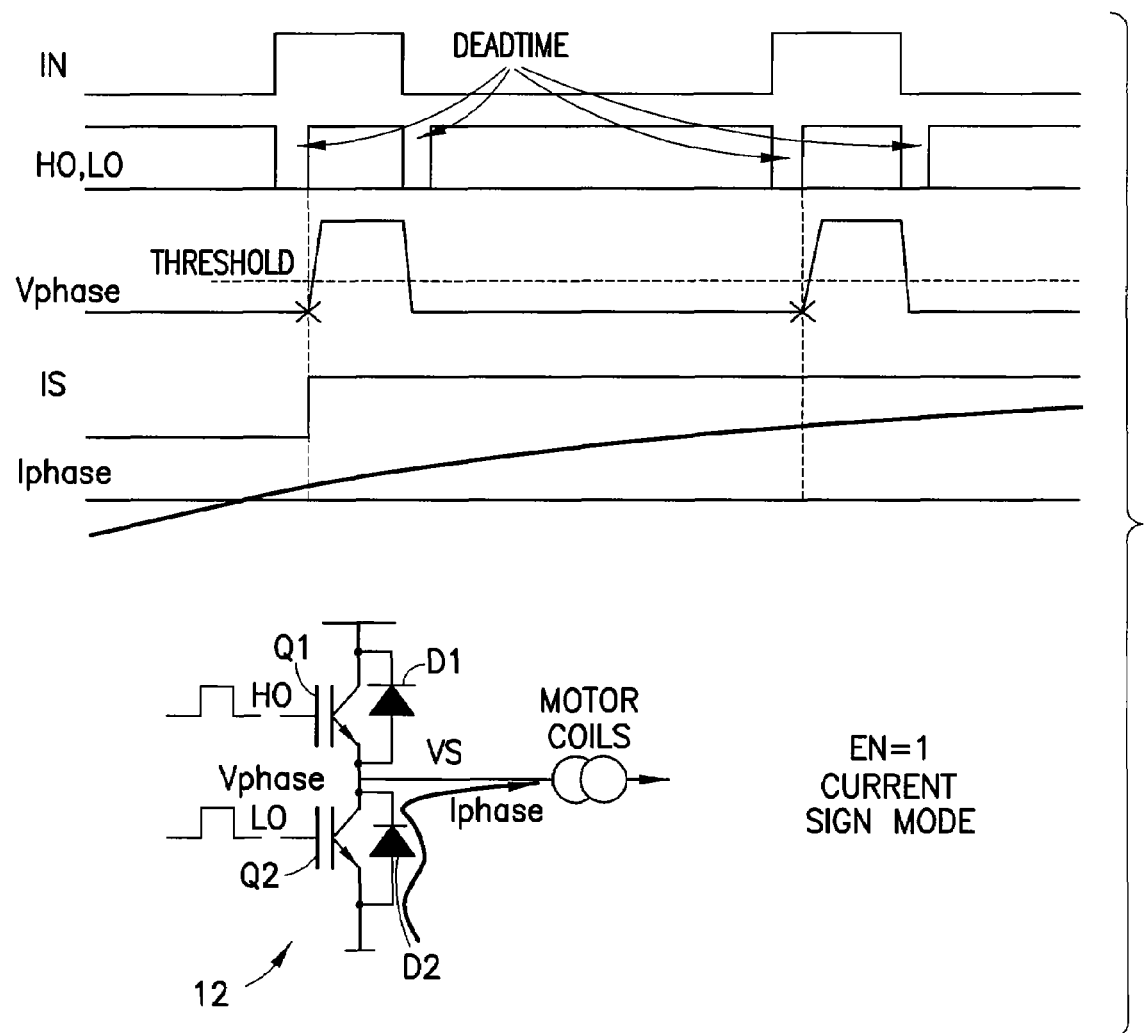
FIG. 2a is a graph of current sign detection of the present invention when a current sign mode is enabled.
Figure 2B:
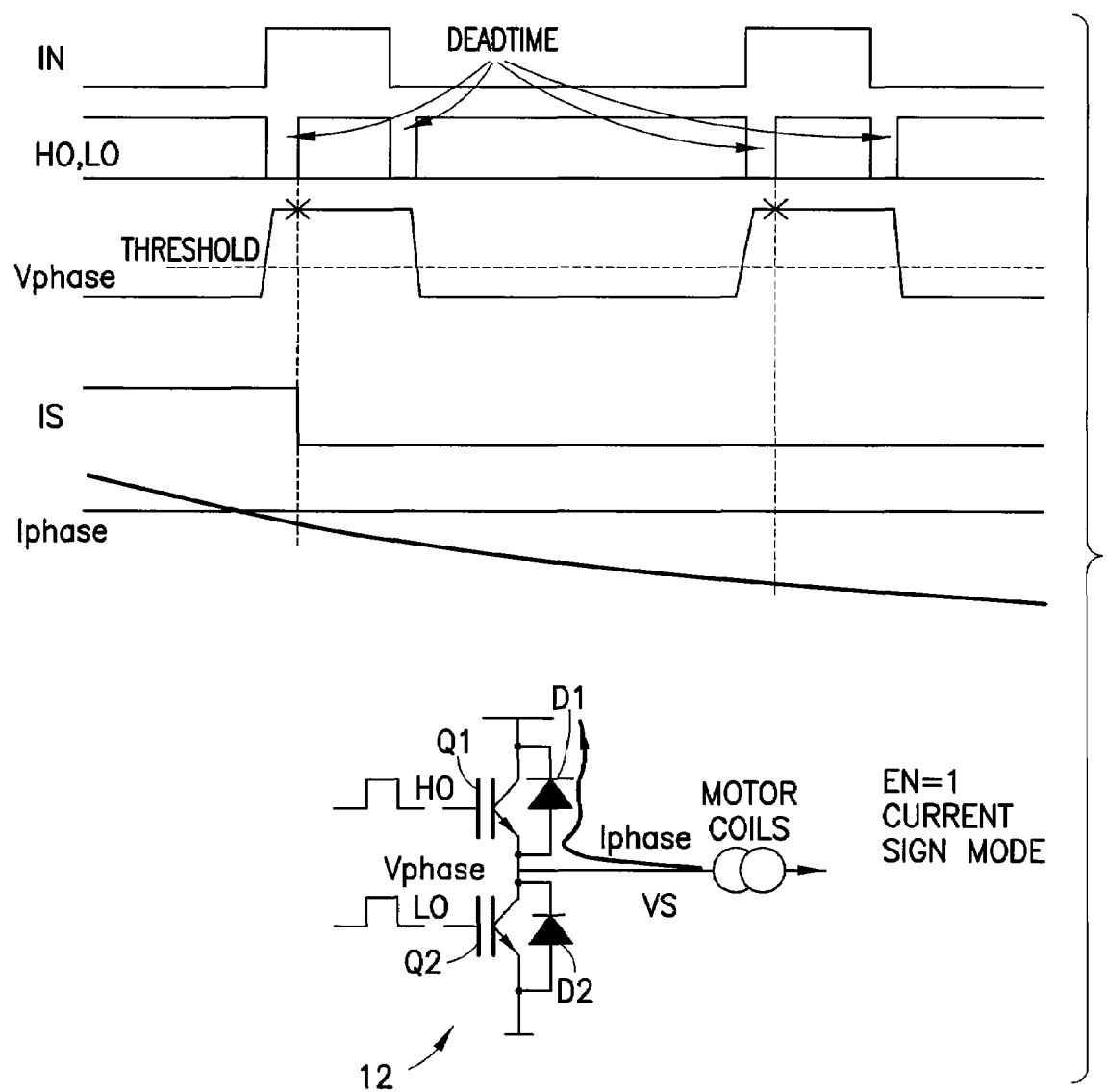
FIG. 2b is a graph of current sign detection of the present invention when a current sign mode is enabled.

As shown in FIG. 2a, when the inverter stage 12 is driven, it introduces a so-called deadtime between turn-OFF of the high side switch Q1 and turn-ON of the low side switch Q2. Also, as shown in FIG. 2b, deadtime is introduced between the low side switch Q2 turn-OFF and high side switch Q1 turn-ON to prevent inverter cross conduction. In the present implementation of the system 10, the deadtime is built into the gate driver GD1.

During the deadtime insertion, the inverter remains momentarily in a tri-state. Motor current direction then forces one of the freewheeling diodes D1, D2 to turn-ON and, as a consequence, phase voltage is driven either up to the power supply voltage (FIG. 2b) or down to the ground voltage (FIG. 2a). More particularly, as in FIG. 2a, if the current $I_{phase}$ was flowing into the motor, the low side free-wheeling diode D2 turns-ON and the phase voltage goes to the ground level. Alternatively, as in FIG. 2b, if the current was flowing into the inverter stage 12, the high side free-wheeling diode D1 turns-ON and the phase voltage goes to the power supply voltage.

Figure 3:
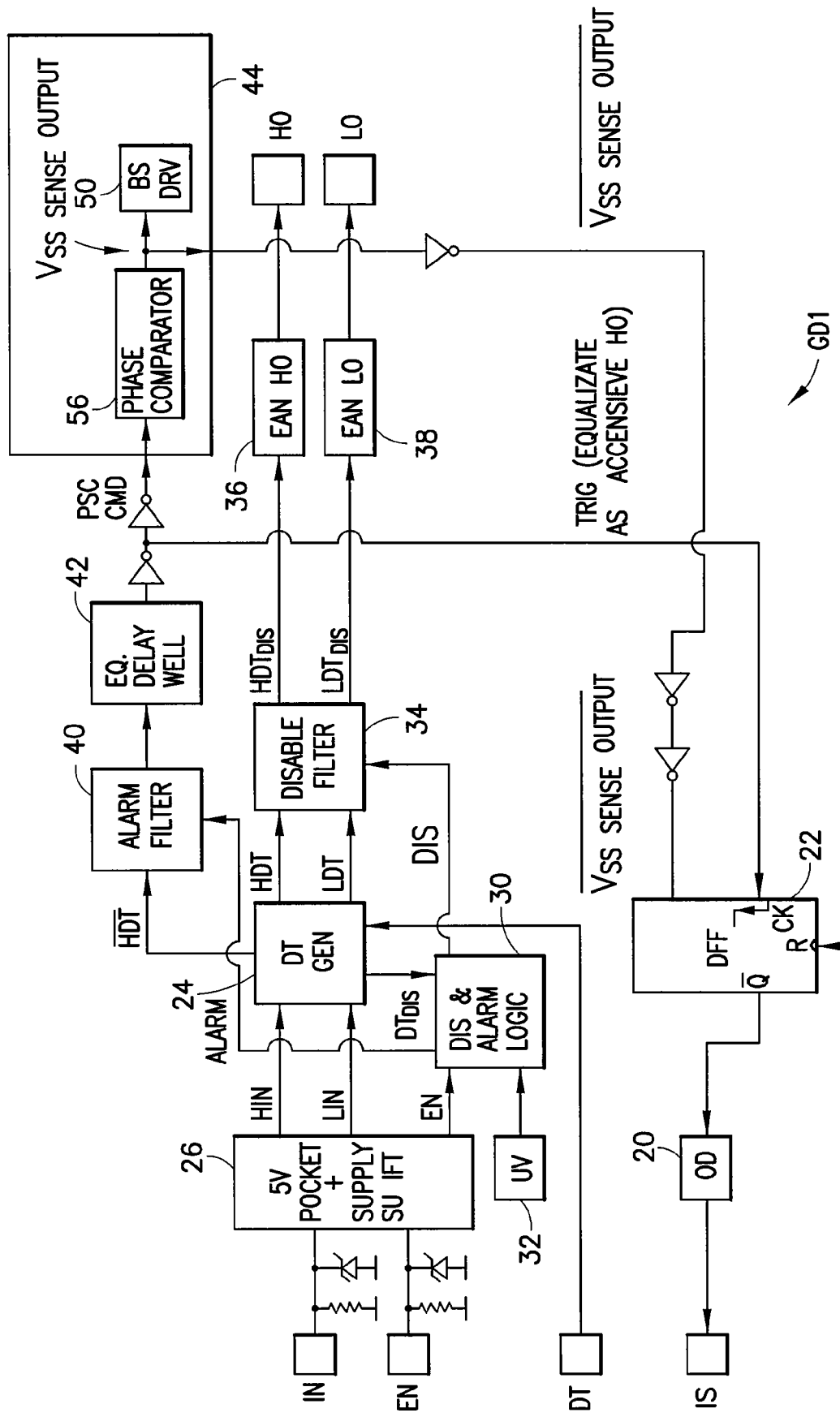
FIG. 3 is a block diagram of the gate driver of the present invention.

For this reason, sensing the phase voltage during the deadtime gives an indication of the direction of the current. To this end, as shown in FIG. 3, the gate driver IC GD1 includes a current sign detection functional mode. This mode is enabled by setting enable EN pin ON. When EN pin is ON outputs and deadtime insertion by the gate driver IC are enabled. When EN pin is OFF, $V_{BEMF}$ mode is ON, and HO and LO pins are disabled. The duration of the deadtime is externally programmable via input DT pin from 500 ms to 5 ns and provided to a DT generator circuit 24.

Other pins of the gate driver IC GD1 include IS pin which is an output of an open drain circuit 20 that receives latched positive or negative phase current from a latch 22. IN pin provides a voltage input that is in phase with VS pin. When IN pin is set High, HO pin is ON, when IN pin is set Low, LO pin is ON. Output HO and LO pins provide signals for respectively driving the High and Low switches Q1 and Q2 of the inverter stage 12 (FIG. 1).

A voltage supply circuit 26 provides HIN and LIN signals for the HO and LO pins respectively to the DT generator circuit 24 and an enable signal EN to a disable and alarm logic circuit 30. Additionally, an under-voltage protection circuit 32 indicates to the disable and alarm logic circuit 30 if undervoltage condition was detected. The DT generator circuit 24 provides HDT and LDT signals comprised respectively of the HIN and LIN signals plus the deadtime to a disable filter. The disable filter 34 also receives a signal DIS from the disable and alarm logic circuit 30 and provides $HDT_{DIS}$ and $LDT_{DIS}$ signals comprised respectively of HDT and LDT signals plus the DIS signal to HO and LO driving circuits 36 and 38 that set HO and LO pins ON and OFF.

The signals of the circuit GD1 of FIG. 3 are as follows:

| | |
|---|---|
| IN: | INPUT IN PHASE WITH VS (IN = HIGH → HO ON  IN = LOW → LO ON) |
| EN: | ENABLE ACTIVE HIGH → EN = O $V_{BEMF}$ MODE ON, HO & LO DISABLED |
| DT: | EXTERNA PROG. DEADTIME (500 ηS TO 5 μS) |
| IS: | OPEN DRAIN OUTPUT LATCHED (PHASE CURRENT POSITIVE OR NEGATIVE) |
| HIN: | GENERATED FROM IN |
| LIN: | GENERATED FROM IN |
| HDT: | HIN + DEADTIME |
| LDT: | LIN + DEADTIME |
| $HDT_{DIS}$: | HDT + DISABLE |
| $LDT_{DIS}$: | LDT + DISABLE |
| PSCCMD: | PHASE SENSE COMPARATOR CMD ($\overline{HDT}$ + ALARM) |
| ALARM: | DISABLE SIGNAL GENERATED FROM INTERNAL FAILURE (UNDERVOLTAGE, $DT_{DIS}$) |
| DIS: | ALARM OR EN = O |

Further, the disable and alarm logic circuit 30 and the DT generator circuit 24 provide, respectively, ALARM and inverted HDT signals to an alarm filter circuit 40, which through a delay circuit 42 provides a phase sense comparator command $PSC_{CMND}$ that comprises the HDT and ALARM signals to a sensing circuit 44. The ALARM signal is a disable signal generated from internal failure, i.e., undervoltage and $DT_{DIS}$. The disable signal DIS is ON when ALARM or EN equal to 0.

The sensing circuit 44 comprises a phase comparator 56 and a bootstrap diode emulator driver 50. This circuit is described in U.S. patent application Ser. No. 11/207,465, filed Aug. 19, 2005 entitled BOOTSTRAP DIODE EMULATOR WITH DYNAMIC BACK-GATE BIASING AND SHORT-CIRCUIT PROTECTION. However, the circuit described therein is used only for the purpose of driving the bootstrap diode emulator driver circuit 50. It has been realized that the circuit can be adapted to the purpose described herein for controlling a sensorless motor drive.

Figure 4:
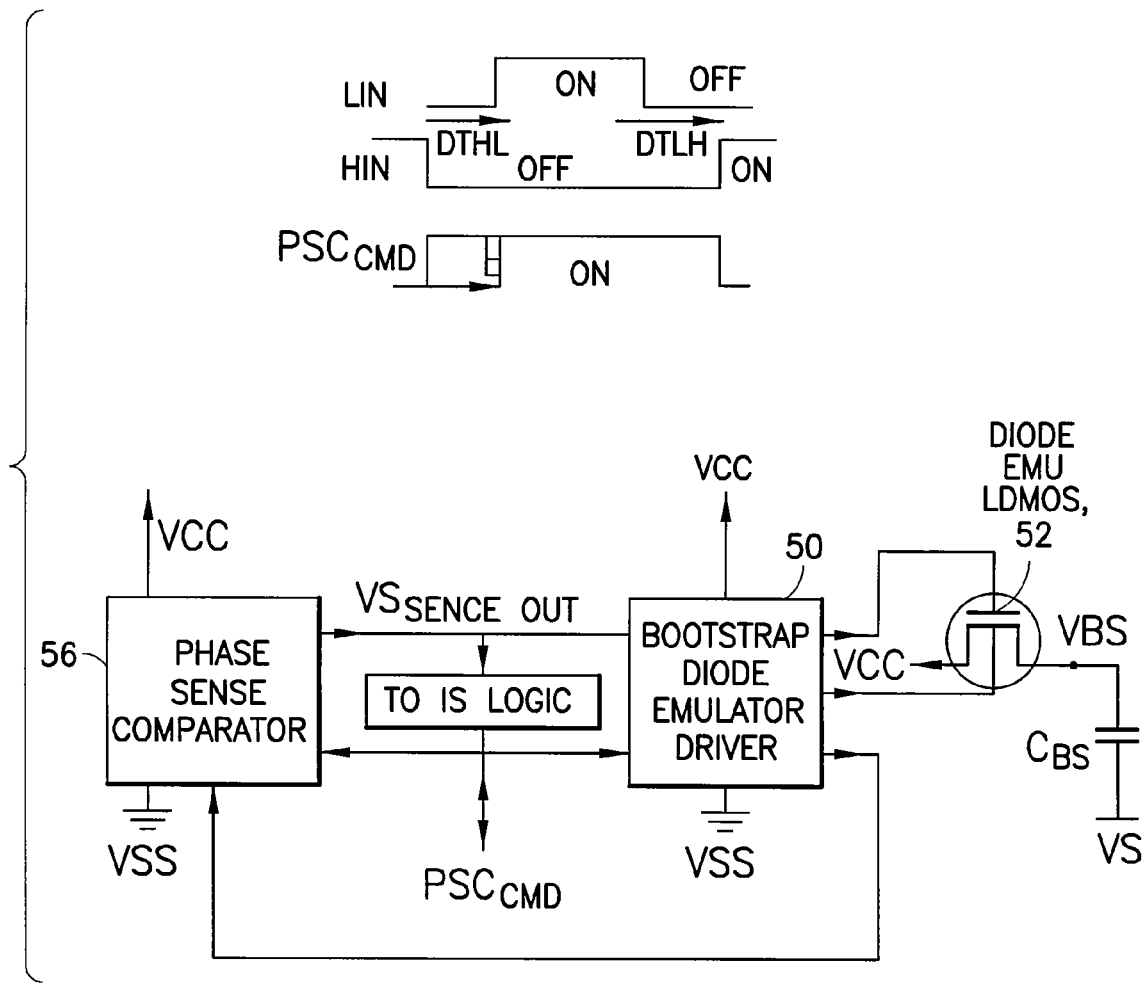
FIG. 4 is a block diagram of a bootstrap diode emulator and a phase sense comparator.

FIG. 4 shows the sensing circuit 44 in greater detail. The circuit includes the bootstrap diode emulator driver 50 having two gate control circuits and a dynamic back-gate biasing circuit.

The first gate control circuit drives the gate of a diode emulator LDMOS 52. This circuit emulates a bootstrap diode to generate the high side floating supply voltage VBS across bootstrap capacitor $C_{BS}$. The bootstrap diode emulator driver 50 and the phase sense comparator 56 both receive a low side supply voltage VCC and a logic ground VSS. The diode emulator LDMOS 52 is connected between the low side supply voltage VCC and the high side floating supply voltage VBS. The high side floating supply voltage VBS is provided across a capacitor $C_{BS}$, which is connected to the switched node (phase) VS. The phase sense compare command $PSC_{CMD}$ consists of a sum of the inverse of the HDT signal provided by the DT generator circuit 24 and the ALARM signal provided by the disable and alarm logic circuit 30.

Figure 4A:
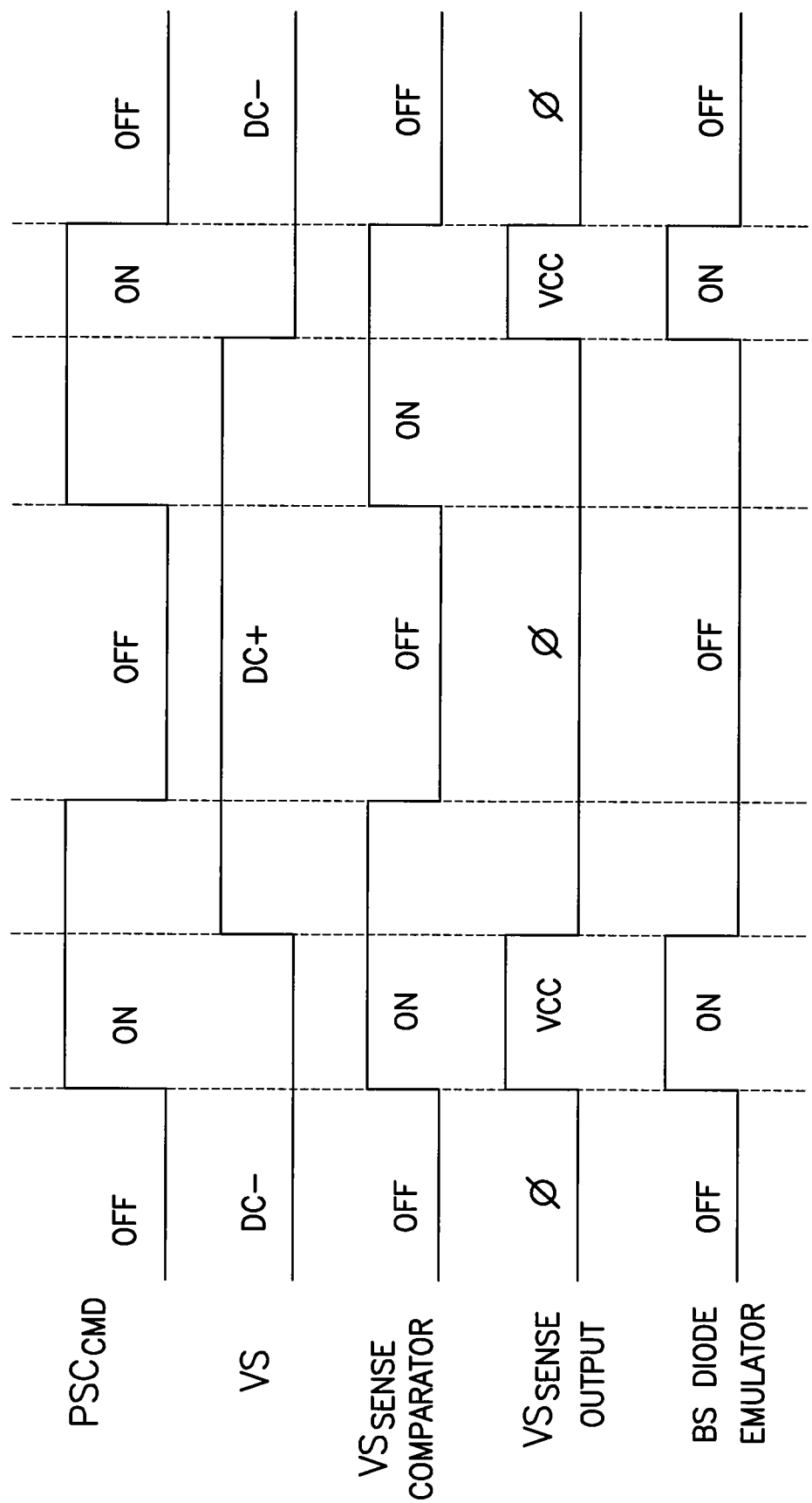
FIG. 4a is a functional graph of the bootstrap diode emulator and the phase sense comparator.
Figure 5:
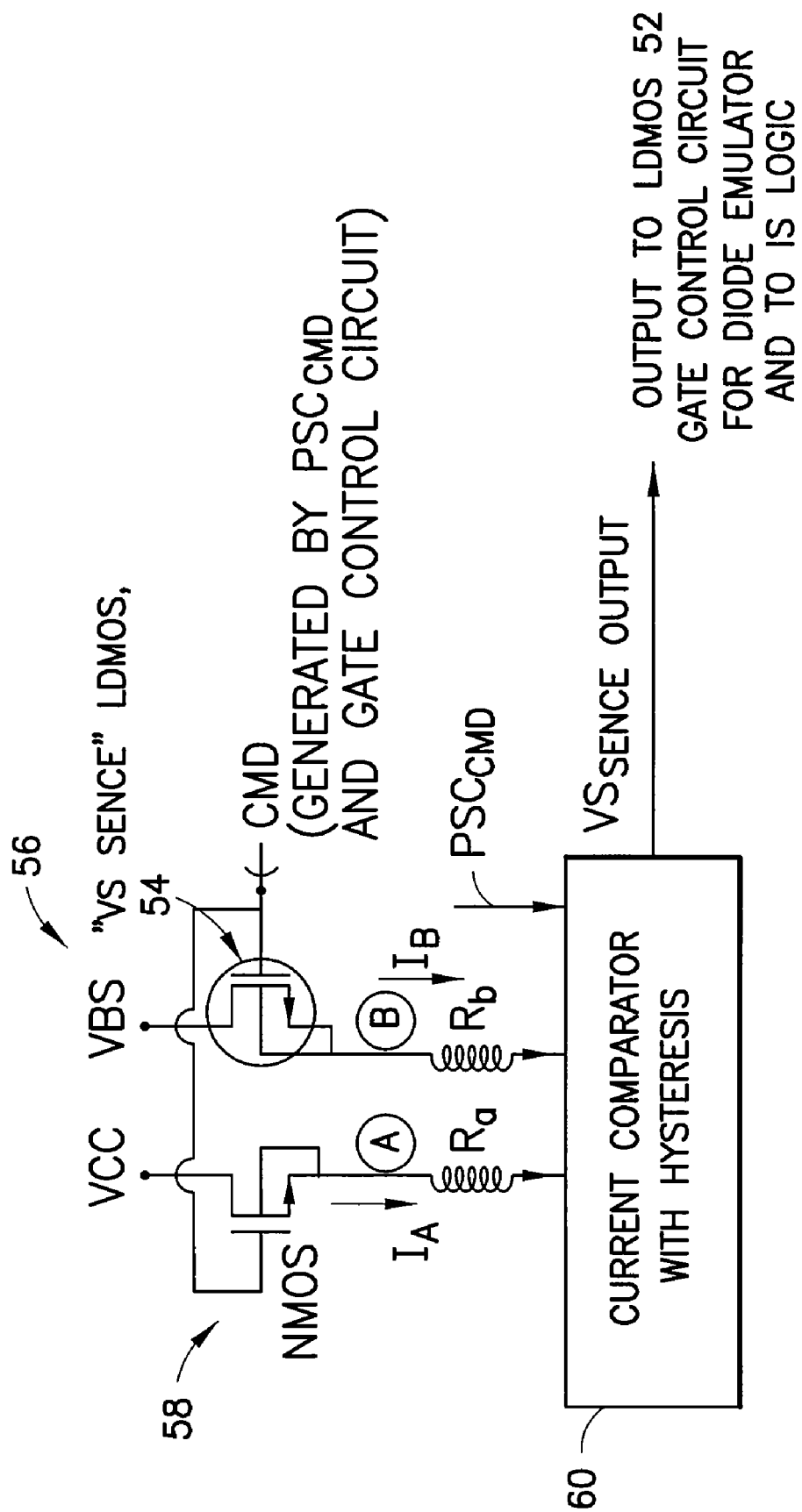
FIG. 5 is a block diagram of the phase sense comparator.

In the embodiment of the invention shown in FIG. 5, the phase sense comparator 56 is operative to turn OFF the diode emulator 52 when VS goes to the high voltage DC+ and the low side control signal $LO_{PD}$ is still turned on. The phase sense comparator 56 also prevents the turn-ON of the diode emulator 52 if VS is not at DC-(GND). This is illustrated in FIG. 4a, which illustrates the timing diagram of the bootstrap diode emulator 52 and the phase sense comparator 56. As shown, the bootstrap diode emulator 52 is only turned on at the appropriate time when VS is at zero.

The comparator circuit 56 uses LDMOS device 54 and low-voltage NMOS 58 to compare VBS, which approximately equals the combination of VS and VCC, and VCC. The respective currents $I_A$ and $I_B$ through the LDMOS 54 and the NMOS 58 via resistors Ra and Rb are provided to a current comparator 60 having a hysteresis characteristic.

Figure 5A:
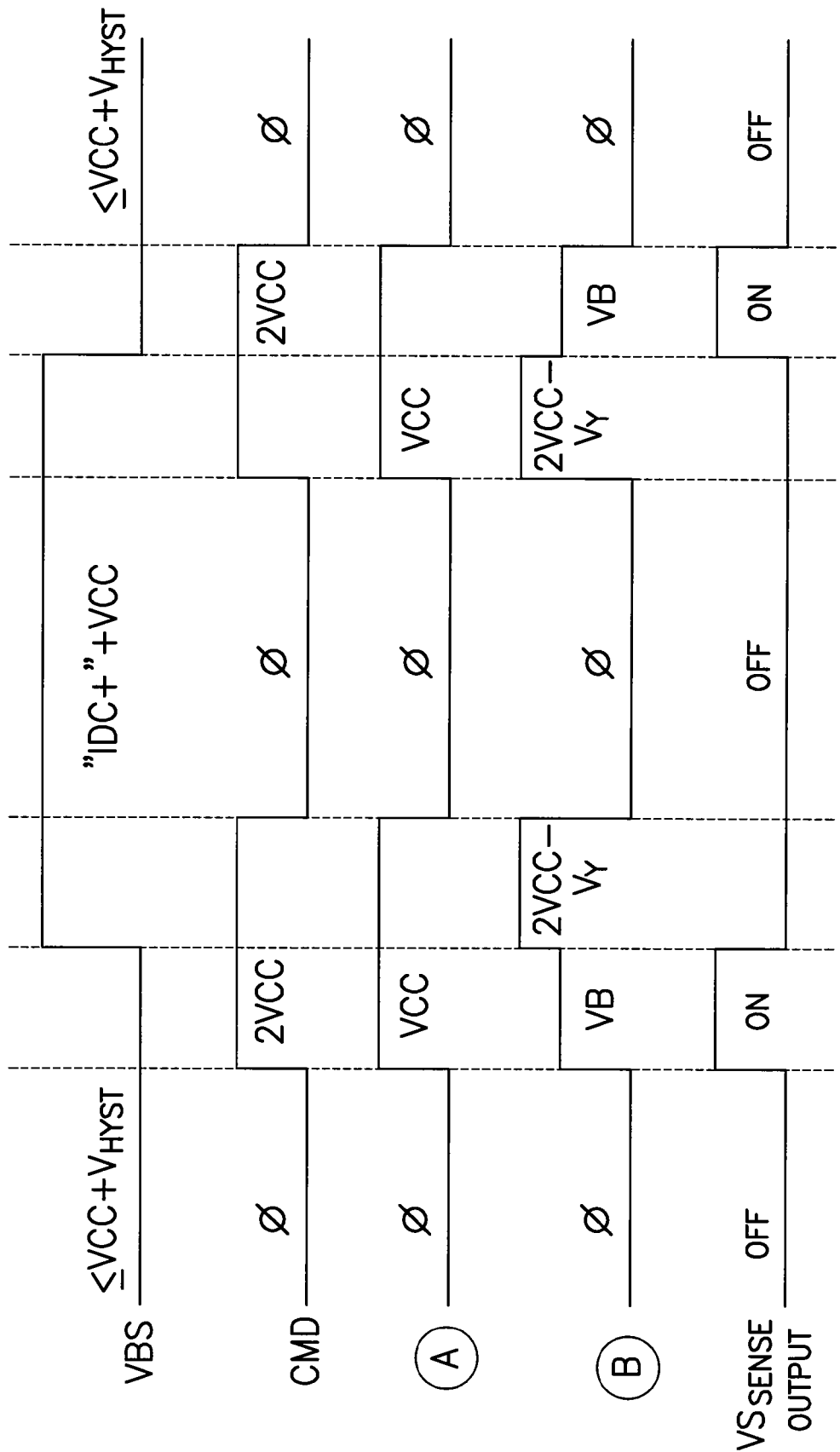
FIG. 5a is a functional graph of the phase sense comparator.

When the $PSCC_{MD}$ signal is turned ON, the current comparator 60 is enabled and the first gate control circuit provides the signal used to turn on the VS sense LDMOS 54. Then, as shown in FIG. 5a, if VB≦VCC+Vhysteresis, then the current comparator 60 enables the second gate control circuit to turn ON the diode emulator LDMOS 52 (VSSENSE OUTPUT goes high). The diode emulator 52 stays turned ON until the $PSCC_{MD}$ signal is turned OFF, or until VBS becomes ≧VCC+Vhysteresis.

The current sign detection setting of pins of the gate driver are represented in Table 2.

TABLE 2

| Pin | Description | configuration | outout mode |
|---|---|---|---|
| EN | Input Enable outputs | 0, 1 (logic) | 0 → HO = LO = 0<br>1 → HO, LO follow IN |
| IN | Input Drives output according to its state | 0, 1 (logic) | 0 → HO = 0; LO = 1<br>1 → HO = 1; LO = 0 |
| IS | Output changes accordingly to VB voltage state | open collector | VB > threshold → sinks current<br>VB < threshold → open |

TABLE 2-continued

| Pin | Description | configuration | outout mode |
|---|---|---|---|
| VB | In-Out<br>Floating supply | | |
| VS | In-Out<br>Phase voltage, floating ground | | |
| HO | Output<br>Gate drive for high side power device (Q1) | VS, VB | IN = 0 → HO = 0<br>IN = 1 → HO = 1 |
| LO | Output<br>Gate drive for low side power device (Q2) | Gnd, supply | IN = 0 → LO = 1<br>IN = 1 → LO = 0 |
| DT | Input<br>Programmable deadtime duration | connected to Gnd<br>via ext. resistor | changes deadtime duration<br>according to ext. resistor value |

Figure 6A:
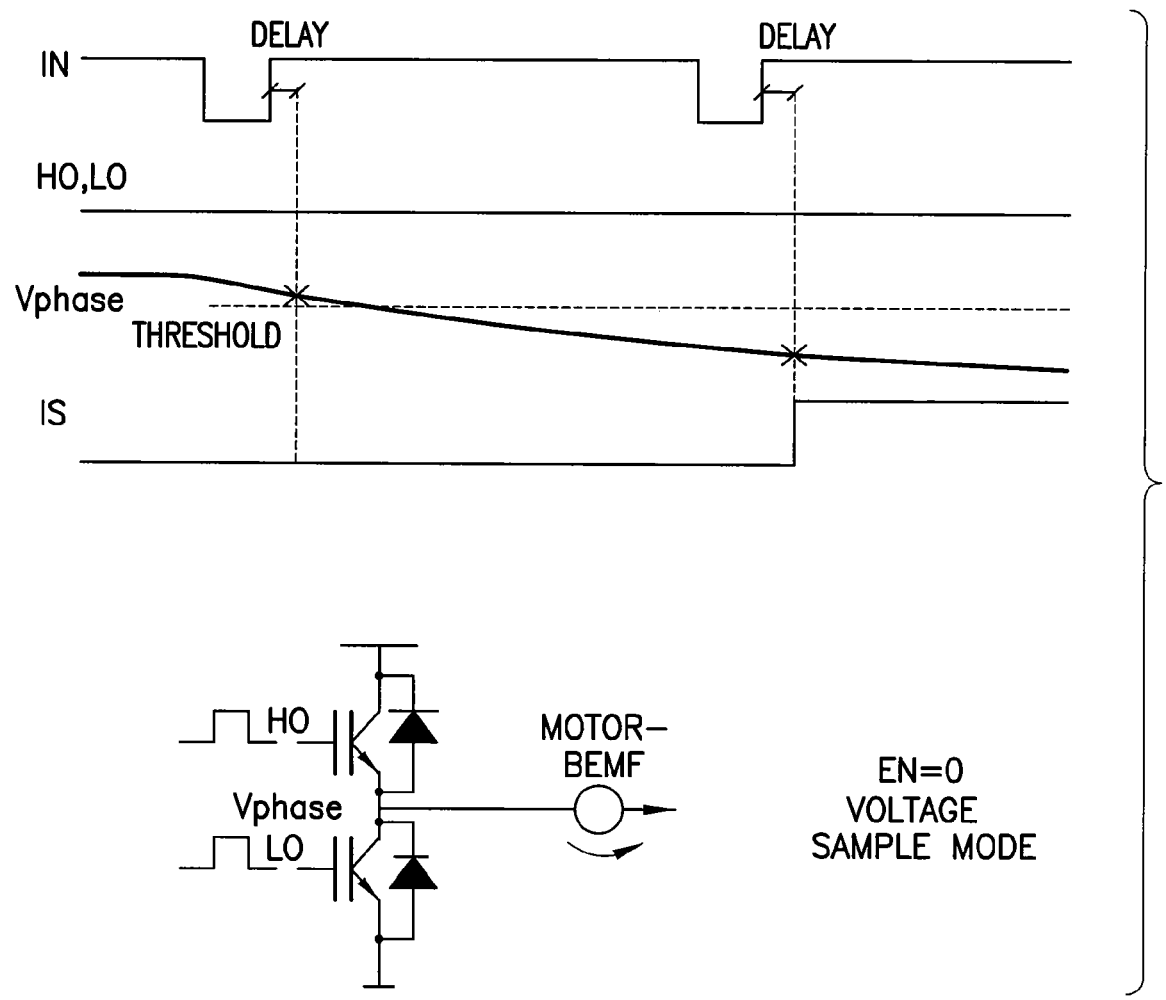
FIG. 6a is a graph of phase voltage sampling of the present invention when a voltage sample mode is enabled.

As shown in FIG. 6a, when tri-stating the inverter bridge 12, EN pin is set to OFF. After some time, which depends on impedance of the motor, the motor current decays to zero. In this case, phase voltage is, in general, floating. Moreover, as shown in FIG. 4b, when EN pin is OFF, the gate driver GD1 can be driven in a way that allows sampling of the state of the phase voltage with respect to a fixed threshold. This is particularly useful when the other two phases of the motor are driven to ground, such that the motor counter EMF produces a voltage on the tri-stated phase.

This counter EMF produced voltage is proportional and in phase with the tri-state phase of the counter EMF. For this reason, detecting the ground crossings of the phase voltage produces a signal that represents the counter EMF zero crossings. This counter EMF zero crossing information can be used for the control of the brushless AC/DC motor control.

Returning to FIG. 3, phase ground crossing detection mode can be enabled by forcing EN pin OFF or to 0, which disables the gate drive outputs, and providing a pulsed signal as an input to IN pin in order to sample the phase voltage state when this information is needed.

Figure 6B:
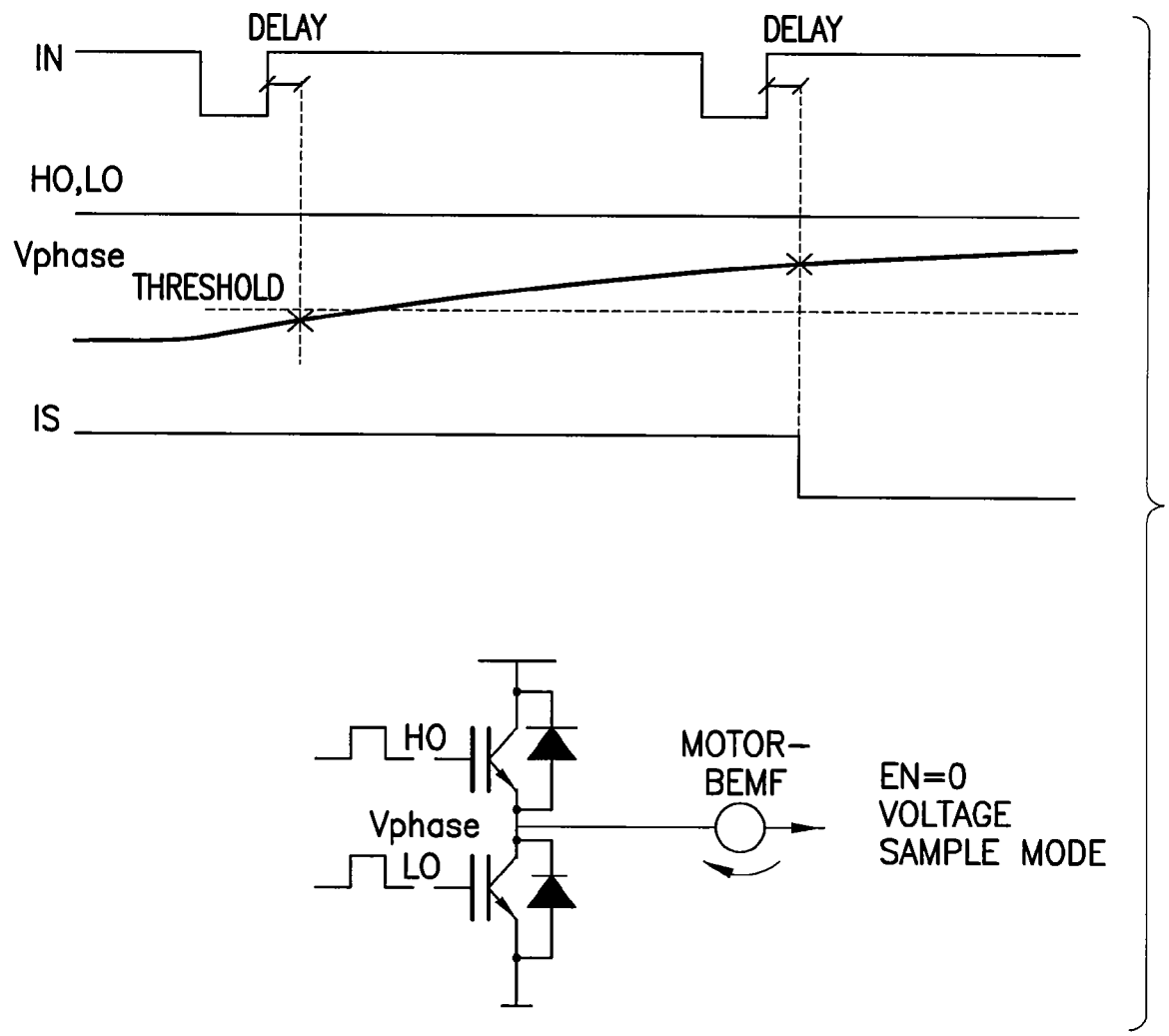
FIG. 6b is a graph of phase voltage sampling of the present invention when a voltage sample mode is enabled.

The sampling principle is shown in FIG. 6. In this example the sampling signal at IN pin is used in active low signal. IS, which is the result of the comparison between the phase voltage and a fixed threshold updates its state each time the sampling signal is activated.

By determining the phase current direction, information is obtained for the commutation control of a sensorless brushless motor. The back EMF is also used for this purpose, as known in the literature. By providing the phase comparator circuit according to the invention, the control circuit can be simplified. In particular, an A/D converter circuit employed in the prior art circuits can be eliminated.

As shown in FIG. 3, the output of the phase comparator 5b is provided to the IS Logic (pin IS) for the sensorless motor control.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for indirectly measuring a sign of a current flowing in an inverter stage coupled to a phase of a motor or induced by a counter Electromotive Force (EMF) in a coil of the phase of the motor, the inverter stage being connected between a power supply and the ground, the circuit comprising:
    a gate driver circuit coupled to the inverter stage for alternatively connecting the phase of the motor to the power supply and to ground, the gate driver circuit having a current sign detection circuit,
    wherein the current sign detection circuit, in a current sign mode, senses the sign of the current flowing in the inverter stage for controlling the commutation of switches in the inverter stage, and, in a voltage sample mode, samples a counter EMF voltage across the coil with respect to a fixed threshold voltage and uses EMF zero crossing information to control the motor.

2. The circuit of claim 1, wherein the inverter stage is a half bridge having high- and low-side switches connected in series at a node, the high-side switch being coupled to the power supply and the low-side switch being coupled to ground, the node being coupled to the phase of the motor.

3. The circuit of claim 1, wherein the inverter stage further comprises a rectifier having high- and low-side freewheeling diodes, a cathode of the low-side diode being coupled at the node to an anode of the high-side diode, a cathode of the high-side diode being coupled to the power supply and an anode of the low-side diode being coupled to the ground.

4. The circuit of claim 1, wherein the gate driver circuit compares a voltage of the inverter stage to a threshold and provides an output to the inverter stage, the output varying in accordance with a result of the comparison.

5. The circuit of claim 1, further wherein in the voltage sample mode, the counter EMF is sensed when the current in the coil has decayed to zero.

6. The circuit of claim 2, wherein when driven, the inverter stage introduces a deadtime between turn-OFF of the high-side switch and turn-ON of the low-side switch and between turn-OFF of the low-side switch and turnON of the high-side switch to prevent inverter cross conduction.

7. The circuit of claim 6, wherein the deadtime is built into the gate driver.

8. The circuit of claim 7, wherein during the deadtime the inverter stage momentarily remains in a tri-state.

9. The circuit of claim 8, wherein in the current sign mode when the current sign detection circuit is enabled the gate driver output and deadtime insertion are enabled and when the current sign detection circuit is disabled the gate driver output is disabled and the EMF voltage mode is enabled.

10. The circuit of claim 2, wherein current flow in a direction of the motor phase forces the low-side freewheeling diode to turn-ON setting the motor phase voltage at the ground and current flow in a direction of the inverter stage forces the high-side freewheeling diode to turns-ON setting the motor phase voltage at the power supply voltage.

11. The circuit of claim 6, wherein the current sign detection circuit further comprises a phase sense comparator and an output of the phase comparator further controls a bootstrap diode emulator circuit.

12. The circuit of claim 8, wherein when the inverter stage is in tri-state, the current sign detection circuit is disabled allowing the current in the coil to decay to zero and the gate driver circuit allows sampling a state of the motor phase voltage with respect to a fixed threshold.

13. The circuit of claim 12, wherein in a three phase motor when two of the phases are at ground voltage and the motor produces counter EMF in the inverter stage in tri-state, the counter EMF produced voltage is proportional and in phase with the tri-state phase of the counter EMF.

14. The circuit of claim 13, wherein detection of a ground crossings of the motor phase voltage produces a signal that represents the counter EMF zero crossings.

15. The circuit of claim 14, wherein in the voltage sampling mode when the current sign detection circuit is enabled the phase ground crossing detection is enabled and the gate drive outputs are disabled.

16. The circuit of claim 15, wherein the voltage sampling mode is activated by a pulsed sampling signal provided to activate sampling of a motor phase voltage state.

17. The circuit of claim 16, wherein a comparison between the motor phase voltage and a fixed threshold is updated each time the voltage sampling mode is activated.

* * * * *

UNITED STATES PATENT AND TRADEMARK OFFICE
CERTIFICATE OF CORRECTION

| | | |
|---|---|---|
| PATENT NO. | : 7,719,223 B2 | Page 1 of 1 |
| APPLICATION NO. | : 11/683150 | |
| DATED | : May 18, 2010 | |
| INVENTOR(S) | : Grasso et al. | |

It is certified that error appears in the above-identified patent and that said Letters Patent is hereby corrected as shown below:

In the claims, column 6, line 46, "turnON" should be changed to --turn-ON--.

Signed and Sealed this
Twenty-second Day of November, 2011

David J. Kappos
*Director of the United States Patent and Trademark Office*